H. VANDERWILT.
PLOWSHARE.
APPLICATION FILED DEC. 28, 1918.
1,318,621. Patented Oct. 14, 1919.
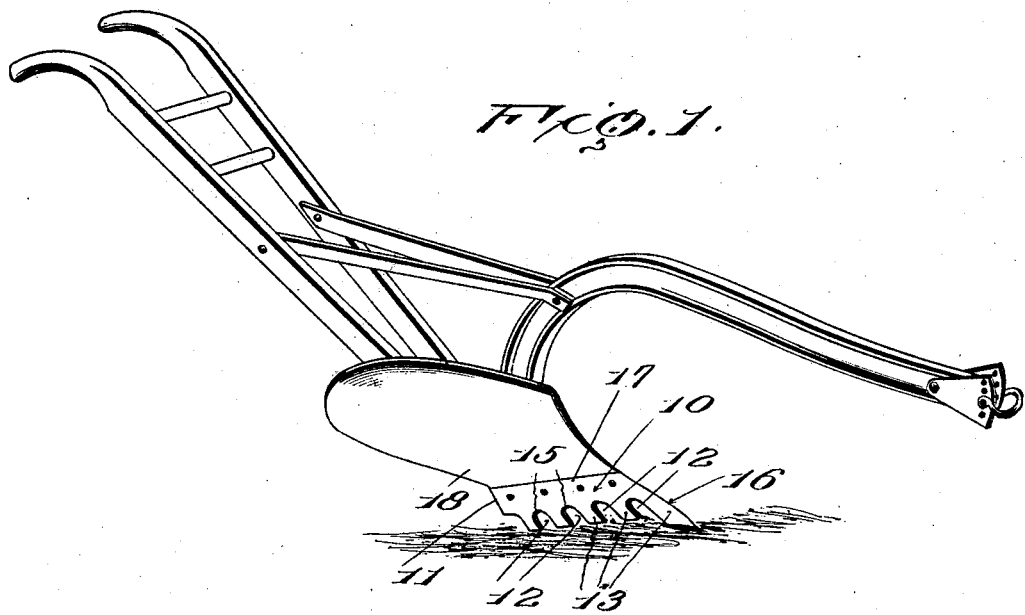
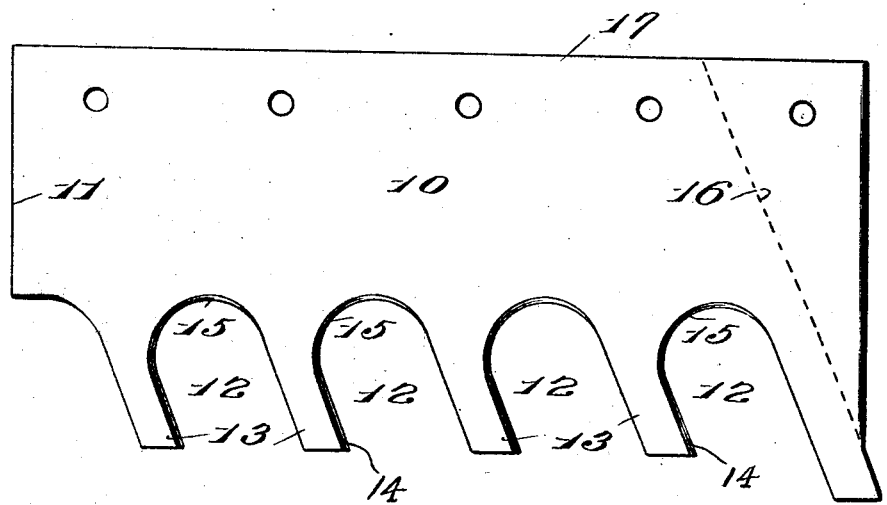

UNITED STATES PATENT OFFICE.

HARRY VANDERWILT, OF SOLOMON, KANSAS.

PLOWSHARE.

1,318,621.  Specification of Letters Patent.  Patented Oct. 14, 1919.

Application filed December 28, 1918. Serial No. 268,628.

*To all whom it may concern:*

Be it known that I, HARRY VANDERWILT, a citizen of the United States, residing at Solomon, in the county of Dickinson, State of Kansas, have invented certain new and useful Improvements in Plowshares, and I do hereby declare the following to be a full, clear, and exact description of the invention, such as will enable others skilled in the art to which it appertains to make and use the same.

This invention relates to new and useful improvements in plows and particularly to plow shares.

One object of the present invention is to provide a novel and improved share which will be effective in cutting in either moist soil or in very hard and dry soil.

Another object is to provide a share which will hold the plow to the desired depth in the soil, and which will operate a great length of time without sharpening.

Other objects and advantages will be apparent from the following description when taken in connection with the accompanying drawing.

In the drawing:

Figure 1 is a perspective view of a plow equipped with my improved plow-share.

Fig. 2 is a plan view of the blank from which the share is formed.

Referring particularly to the accompanying drawing, 10 represents the body of the blank from which the share is formed. The rear edge 11 of the blank is disposed at right angles to the longer edge of the blank, while the other end edge is formed at an obtuse angle to said edge and slightly curved. On the other longer edge of the blank there are formed the notches or recesses 12, which result in the intermediate tooth members 13. These tooth members extend in parallel relation to each other and in approximately parallel relation to the front edge of the blank. The front edges of the teeth 12 are sharpened, as shown at 14, as are also the curved inner walls of the recesses, as shown at 15. Extending from forward lower edge of the first or foremost tooth to a point rearwardly of the front edge, at the top of the blank, is a fold line 16, the portion of the blank outlined by said fold line and the front edge and portion of the top edge of the blank, and designated by the character 17, forms the triangular landside of the plow, when properly bent and bolted to the moldboard 18, as shown in Fig. 1, of the drawing.

Thus, instead of a single cutting edge, presented to the soil, as is the case in the ordinary plow share now in use, the present device has a serrated edge which is less likely to become dull and permit the plow to ride up above its proper depth in the soil. Furthermore, this serrated edge will present so many cutting edges to the soil that the soil will be more easily and effectively cut than otherwise. Furthermore, this serrated edge renders the use of the plow in very hard and dry soils less laborious, and less injurious to the cutting edge of the plow than others heretofore.

The share is readily capable of attachment to any ordinary plow without modifications to the plow, as it is formed for bolting to the frog and moldboard in the same manner as all other shares.

What is claimed is:

As an article of manufacture, a plow share including a body portion generally rectangular in outline, one edge portion of the body being formed with regularly spaced recesses forming obliquely extending tooth portions, one edge of each of which is sharpened, the other longer edge portion of the body being formed with a longitudinal series of openings, one of the endmost of the tooth portions being extended beyond the corresponding edge of the body, said body having its end folded on a line coincident with the outer edge of the said extended tooth portion.

In testimony whereof, I affix my signature in the presence of two witnesses.

HARRY VANDERWILT.

Witnesses:
 GEORGE W. LANK,
 FESS E. COGAN.

Copies of this patent may be obtained for five cents each, by addressing the "Commissioner of Patents, Washington, D. C."